United States Patent [19]

Samy et al.

[11] Patent Number: 5,440,184
[45] Date of Patent: Aug. 8, 1995

[54] ANTIFRICTION BEARING CAPABLE OF GENERATING ELECTRIAL ENERGY

[75] Inventors: Ram P. Samy, Canton; Orestes J. Varonis, North Canton; Michael L. French, Uniontown, all of Ohio

[73] Assignee: The Timken Comapany, Canton, Ohio

[21] Appl. No.: 304,374

[22] Filed: Sep. 12, 1994

[51] Int. Cl.6 .............................................. F16C 32/00
[52] U.S. Cl. ...................................... 310/90; 384/446
[58] Field of Search ......................... 310/156, 90, 90.5; 384/446

[56] References Cited

U.S. PATENT DOCUMENTS

| | | | |
|---|---|---|---|
| 4,688,951 | 8/1987 | Guers | 384/446 |
| 4,732,494 | 3/1988 | Guers et al. | 384/448 |
| 5,021,697 | 6/1991 | Kralick | 310/90.5 |
| 5,085,519 | 2/1992 | Dougherty | 384/448 |
| 5,209,580 | 5/1993 | Nakayama | 384/446 |

OTHER PUBLICATIONS

Dayco Railway Caboose Alternator & Generator Drives.
Sep. 11, 1991 Fifth International conference on Electrical Machines and Drives London: Institution of Electrical Engineers 1991, pp. 31-35.

*Primary Examiner*—Thomas M. Dougherty
*Attorney, Agent, or Firm*—Polster, Lieder, Woodruff & Lucchesi

[57] ABSTRACT

A bearing fits over the journal of a rail car axle and within an adaptor that is received within a pedestal opening of the side frame of a rail car truck. The bearing includes an outer race in the form of a double cup, an inner race in the form of two cones, and rolling elements in the form of tapered rollers. The cup and cones have raceways, and the tapered rollers are arranged in two rows between the raceways. Seals close the ends of the bearing, establishing dynamic fluid barriers around wear rings that encircle the journal beyond both ends of the bearing. The bearing between its two rows of tapered rollers contains a generator for producing electrical energy.

20 Claims, 4 Drawing Sheets

ANTIFRICTION BEARING CAPABLE OF GENERATING ELECTRIAL ENERGY

BACKGROUND OF THE INVENTION

This invention relates in general to antifriction bearings and more particularly to an antifriction bearing that produces electrical energy and its related assembly.

The brakes of freight cars used on North American railroads rely on compressed air for their operation. In the typical freight train, a compressor located in the locomotive supplies compressed air to the individual freight cars through a so-called "train line" that runs the length of the train and hence passes through every car. To apply the brakes, the engineer in locomotive operates a control which changes the pressure of the air in the train line. But the train line does not experience an instantaneous change in pressure. Instead, the change occurs progressively from car to car throughout the length of the train. As a consequence the brakes are applied successively from car to car, and this is not desirable.

The train line represents the only source of external energy available at the typical freight car. While electrically operated controls respond much more quickly and uniformly than air operated devices—or at least air operated brakes controlled from the locomotive—electrical control lines and circuits have not been a part of freight cars. Even if the cars had electrically operated devices for directing pressurized air from the train line to the brakes, the devices would necessarily require solenoids which draw considerable current, and the electrical devices for an entire freight train would require too much current to be serviced by an electrical cable of moderate size. Yet a need exists for brakes which respond more quickly and uniformly than those now available.

Currently, railroads have under consideration a braking system which will rely on electrical control devices on the individual rail cars for controlling the compressed air directed from the train line to the brakes of such cars. An electrically generated signal, perhaps transmitted as an electromagnetic wave, would activate all of the control devices instantaneously. This, of course, would apply the brakes of all the cars in a train simultaneously. But an electrically operated control device on a rail car requires a source of electrical energy at the car, and perhaps the most practical source is a battery. In short, each rail car having an electrically operated control device for activating its brakes should have a battery for supplying the electrical energy—and also a generator of some type for recharging the battery.

To be sure, the cabooses formerly used at the ends of freight trains carried batteries which supplied electricity for lighting and for radio communications with the locomotives at the other ends of such trains. Moreover, the typical caboose had an alternator or generator for recharging the batteries. But the alternator or generator required a complex system of pulleys and belts for coupling it with one of the axles, an arrangement which demanded time and effort to install and more to maintain.

The present invention resides in a bearing that enables an axle, such as on a rail car, to rotate freely while supporting a substantial load. The bearing further produces electrical energy when the axle rotates, and yet is as small as conventional bearings of similar load capacity. The assembly of which it is a part for the most part utilizes traditional components, and the bearing may be substituted for traditional bearings in standard side frames. The invention further resides in the bearing and its related components which together provide an improved bearing assembly. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Referring now to the drawings, a railroad bearing B (FIG. 1) fits over the end of an axle A and is contained within an adaptor C which, in turn, is received in a conventional side frame D of a rail car truck. The axle A extends through wheels which roll along the rails of a railroad track, and by reason of the bearing B, the wheels and axle A rotate with minimum friction about an axis X. When the axle A rotates about the axis X, the bearing B produces electrical energy which has the capacity to charge a battery on the rail car and further reflects the angular velocity of the axle A and hence the speed of the car.

The axle A is standard. As such, it includes a journal 2 which merges with an adjoining larger section 4 of the axle A at a fillet 6. The journal 2 extends out to a squared off end face 8 out of which threaded holes 10 open. The axis of the journal 2 coincides with the axis X.

The bearing B fits over the journal 2 along with other components which serve to hold the bearing B in place and close its ends. Among the other components is a backing ring 12 (FIG. 1) which fits against the fillet 6. The backing ring 12 receives one end of an inboard wear ring 14, the opposite end of which abuts the bearing B. The wear ring 14 encircles the journal 2 and is in turn encircled by a seal 16 which projects axially from the bearing B. By establishing a fluid barrier along the wear ring 14, the seal 16 closes the inboard end of the bearing B. A similar arrangement exists at the outboard end of the bearing B. Here another wear ring 18 encircles the journal 2 and it in turn is encircled by another seal 20. One end of the wear ring 18 abuts the outboard end of the bearing B. The seal 20 projects axially from the outboard end of the bearing B and establishes a fluid barrier with the wear ring 18, thereby closing the outboard end of the bearing B. The opposite end of the outboard wear ring 18 fits into an end cap 22 which extends across the end of the journal 2 slightly beyond the end face 8. The end cap 22 is urged toward the fillet 6 by cap screws 24 which pass through the end cap 22 and thread into the holes 10 that open out of the end face 8 of the journal 2. This arrangement clamps the wear rings 14 and 18 and bearing B between the backing ring 12 and the end cap 22.

The bearing B together with the adapter C and the components which serve to hold the bearing B in place on the journal 2 constitute a bearing assembly.

Figure 1:
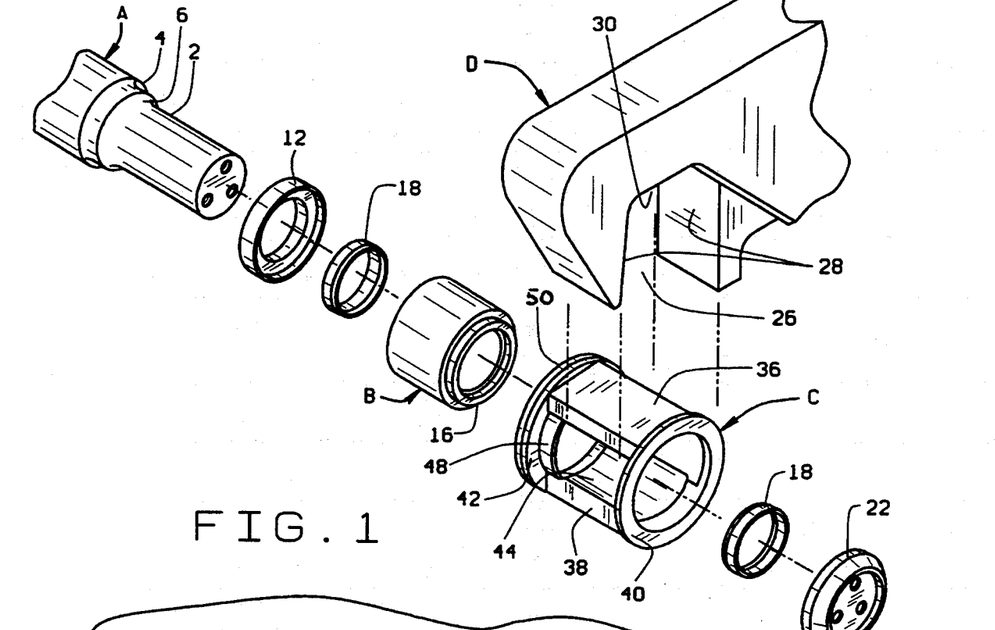
FIG. 1 is a fragmentary perspective view of a side frame and axle journal for a rail car together with an antifriction bearing, an adaptor for accommodating the bearing to the side frame, and other related components which together form a bearing assembly constructed in accordance with and embodying the present invention.
Figure 2:
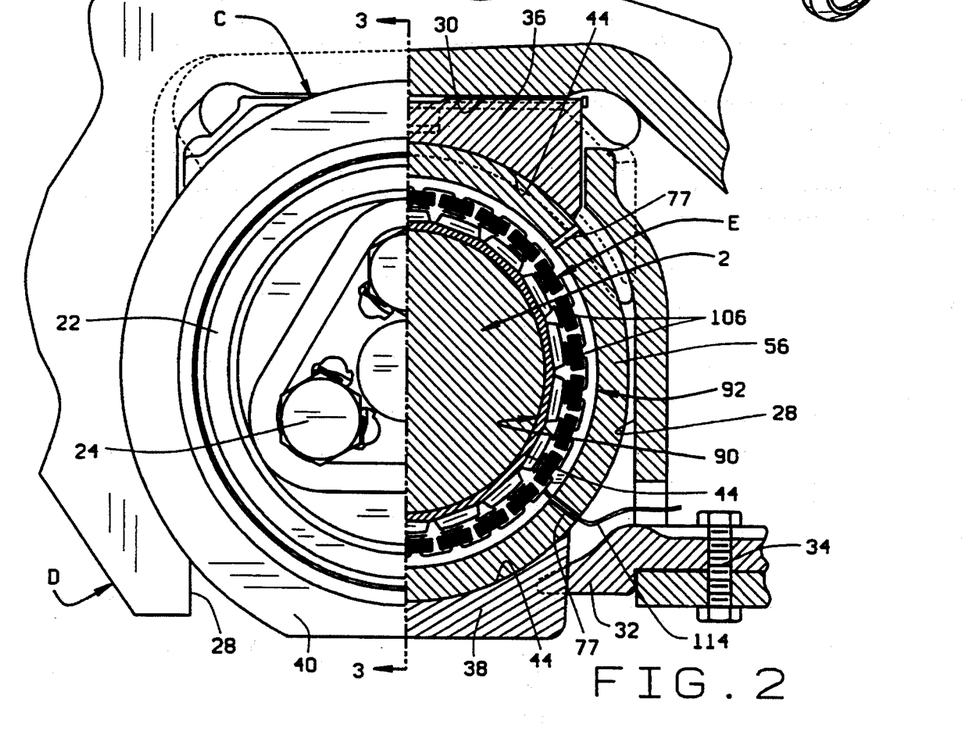
FIG. 2 is an end view, half broken away, and in section, of the bearing assembly.

The side frame D is traditional in configuration (FIGS. 1 & 2). As such it has a pedestal opening 26 formed by vertical side walls 28 and a flat upper surface or pedestal 30. The bottom of the opening 26 is obstructed by a removable frame key 32 which projects from the side frame D past one of the side walls 28 and is secured with a machine bolt 34 which passes through the key 32 and side frame D. The adaptor C fits into the pedestal opening 26 where it is retained by the frame key 32. Thus, to install the adaptor C in the pedestal opening 26, one must first remove the key 32.

The adaptor C (FIGS. 1-3) has a pad 36 of arcuate configuration across its top and a cradle 38, likewise of arcuate configuration, across its bottom and two end rings 40 and 42 connecting the pad 36 and cradle 38, with the spacing between the rings 40 and 42 slightly exceeding the width of the side frame D at the upper surface 30 and side walls 28. The pad 36, cradle 38, and end rings 40 and 42 are all united into a single casting which is machined along the pad 36 and cradle 38 to provide arcuate surfaces having a common center. As such the arcuate surfaces define a bore 44. At the outboard end of the pad 36 an inwardly directed rib 46 projects into the bore 44 and indeed marks the end of the bore 44. The other end of the bore 44 receives an annular rib 48 which forms part of a retaining ring 50 that fits against the inboard end ring 42 and indeed is secured to the end ring 42 with machine screws 52. The bore 44 receives the bearing B, whereupon the removable retaining ring 50 is secured with the machine screws 52. This presents the annular rib 48 within the bore 44, so that the bearing B is captured between the two ribs 46 and 48. The adaptor C fits into the pedestal opening 26 of the side frame D with its flat top surface 50 against flat upper surface 30 of the opening 26 and its end rings 40 and 42 located immediately beyond the side faces of the side frame D in the region of its opening 26. Thus, the rings 40 and 42 prevent the adaptor C from shifting axially out of the opening 26. The pedestal key 32 projects below the cradle 38 and the bottom of the adaptor C and prevents the adaptor C from dropping out of the opening 26. The flat top surface of the pad 36, being against the flat upper surface 30 of the opening 26, prevents the adaptor C from rotating in the opening 26.

The bearing B includes (FIG. 3) an outer race in the form of a double cup 56, an inner race in the form of two cones 58, tapered rollers 60 arranged in two circular rows between the cones 58 and cup 56, cages 62 in each row of rollers 60 for maintaining the proper spacing between the rollers 60 in those rows, and a spacer ring 64 located between the two cones 58 for maintaining the proper distance between them and thereby establishing the setting for the bearing B. Within the bearing B an annular space 66 exists between the two rows of rollers 60, and this space 66 is occupied by a generator E for producing electrical current, preferably alternating current.

Figure 3:
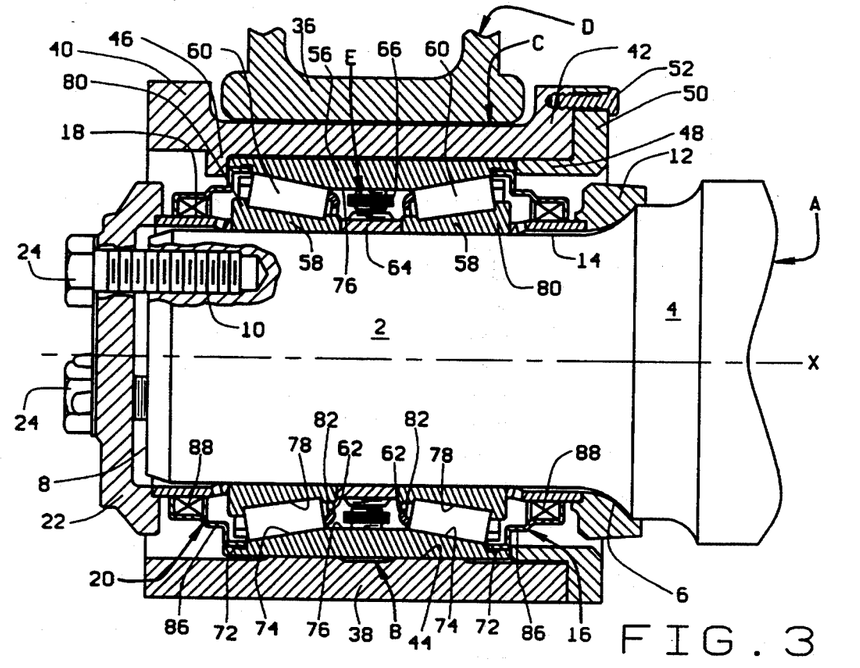
FIG. 3 is a longitudinal sectional view taken along line 3—3 of FIG. 2 and showing the bearing of the bearing assembly.

Turning now to the double cup 56, it resides in the bore 44 of the adaptor C with its ends along the ribs 46 and 48 of the adaptor C (FIG. 3). It has a cylindrical exterior surface, the diameter of which is slightly greater than the diameter of the bore 44. As a consequence, to install the cup 56 in the adaptor C, one must press it into the bore 44 when the retaining rib 50 is detached. Thereafter, the retaining rib 50 is installed on the end ring 42 and secured with the machine screws 52. The interference fit prevents the cup 36 from rotating in the adaptor C and the ribs 46 and 48 prevent it from displacing axially. At each of its ends, the cup 56 has a short end bore 72, and these bores 72 receive the seals 16 and 20. The cup 56 also has two raceways 74 which are presented inwardly toward the axis X and taper downwardly from the end bores 72 to the annular space 66 where they are separated at their small ends by a cylindrical intervening surface 76. Finally, in the region of its intervening surface 76, the cup 56 has several small bores 77 extended radially through it (FIG. 2), preferably at 90°. The cup 56 is installed in the adaptor C with one of the radial bores 77 offset slightly from the cradle 38 of the adaptor C. The remaining bores 77 are plugged, but may be used later in the life of the bearing B when the bearing is withdrawn from the adaptor C for periodic maintenance. Rotating the cup 56 in the adaptor C at these periodic intervals distributes wear more uniformly.

The two cones 58 fit snugly over the journal 2 (FIG. 3), there being an interference fit between the cones 58 and the journal 2, and as a consequence the cones 58 rotate with the axle A. Moreover, the cones 58 fit within the cup 56, one being encircled by one of the cup raceways 74 and the other by the other cup raceway 74 (FIG. 3). Each cone 58 includes a tapered raceway 78 which is presented outwardly toward the surrounding cup raceway 74, a thrust rib 80 at the large end of the raceway 78, and a retaining rib 82 at the small end of the raceway 78. The two ribs 80 and 82 project radially beyond their respective ends of the raceway 78 and run out to end faces, which are squared off with respect to the axis X. The two cones 58 at the end faces on their thrust ribs 80 abut the ends of the wear rings 14 and 18. The two cones 58 at the end faces on their retaining ribs 82 abut the spacer ring 64, and hence the spacer ring 64 determines the spacing between the cones 58.

The tapered rollers 60 lie in two rows between the opposed raceways 74 and 78 of the cup 56 and cones 58 (FIG. 3), respectively, there being essentially line contact between the side faces of the rollers 60 and the raceways 74 and 78. The rollers 60 are on apex, meaning that the apices for the rollers 60 of either row will lie at a common point along the axis X of rotation. Moreover, the large ends of the rollers 60 of each row abut the thrust rib 80 for the cone 58 around which the row lies. Indeed, the thrust ribs 80 prevent the rollers 60 from being expelled from the spaces between the raceways 74 and 78, for when a load is transmitted radially through the bearing B, it will translate into slight axial force components at the rollers 60—force components which would expel the rollers 60 from the bearing B were it not for the thrust ribs 80. Each row of rollers 60 has its own cage 62, and that cage 62 maintains the proper spacing between the rollers 60 of the row. It further holds the rollers 60 around the cone 58 when the cone 58 is withdrawn from the cup 56.

The spacer ring 64 (FIG. 3) determines the distance between the two cones 58, and that in turn controls the setting for the bearing B, that is to say, whether the bearing B operates in a condition of preload or end play and the magnitude of that condition as well. Indeed, when the cap screws 24 are turned down and urge the end cap 22 toward the backing ring 12, the wear ring 18 is driven toward the wear ring 14 and that in turn drives the two cones 58 together, but the spacer ring 64 separates the two cones 58 and determines the spacing between them—and hence the setting for the bearing B. The spacer ring 64 is thus clamped snugly between the ends of the two cones 58. In contrast to conventional cone spacers, which are designed for a loose fit and manufactured with wide radial tolerances, the spacer ring 64 is machined with considerable precision insofar as its radial dimensions are concerned. In this regard, its interior dimension is such as to produce an interference fit with the journal 2. This insures that exterior surface remains perfectly concentric with the journal 2. The annular space 66 lies between the intervening cylindrical surface 76 of the cup 56 and the spacer ring 64 that separates the cones 38. The rollers 40 and cages 42 define the ends of the space 46.

The seals 16 and 20 may be considered part of the bearing B in that they are carried by the cup 56 of the bearing B (FIG. 3). Each includes a metal seal case 86 and an elastomeric seal element 88. The case 86 of the inboard seal 16 fits into the inboard end bore 72 of the cup 56 with an interference fit, and thus a static fluid barrier exists between the case 86 and cup 56. The seal element 88 of the seal 16 circumscribes the inboard wear ring 14 and establishes a dynamic fluid barrier around the ring 14. The case 86 of the outboard seal 20 fits into the outboard end bore 72 of the cup 56 with an interference fit to establish another static barrier, while the seal element 88 establishes a dynamic fluid barrier around the outboard wear ring 18. The seals 16 and 20 together with the wear rings 14 and 18 close the ends of the bearing B, retaining lubricants in the region of the rollers 40 and excluding contaminants.

Figure 5:
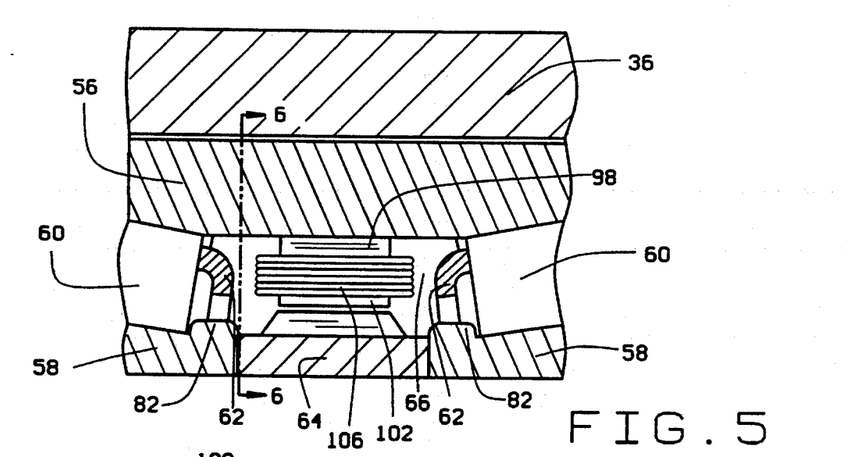
FIG. 5 is an enlarged sectional view of the region of the bearing containing the generator.

The electrical generator E occupies the annular space 46 between the two rows of tapered rollers 60 (FIG. 5). It includes a rotor 90 which revolves with the journal 2 and the cones 58 and a stator 92 which is carried by the cup 56. Being integrated into the bearing B, the generator E is protected from the harsh railroad environment. It also eliminates the need for a belt or gear drive system identified with traditional electrical power sources on rail cars. The generator E operates on the traditional principles of electromechanical energy conversion. It acts as an electrical power source to charge an on-board battery in a freight car when the car is moving. The generator E also provides speed information (revolutions per minute) in that it produces a pulsating voltage, the frequency of which can be measured and correlated with angular velocity. This eliminates the need for separate speed sensors in the freight cars.

Figure 4:
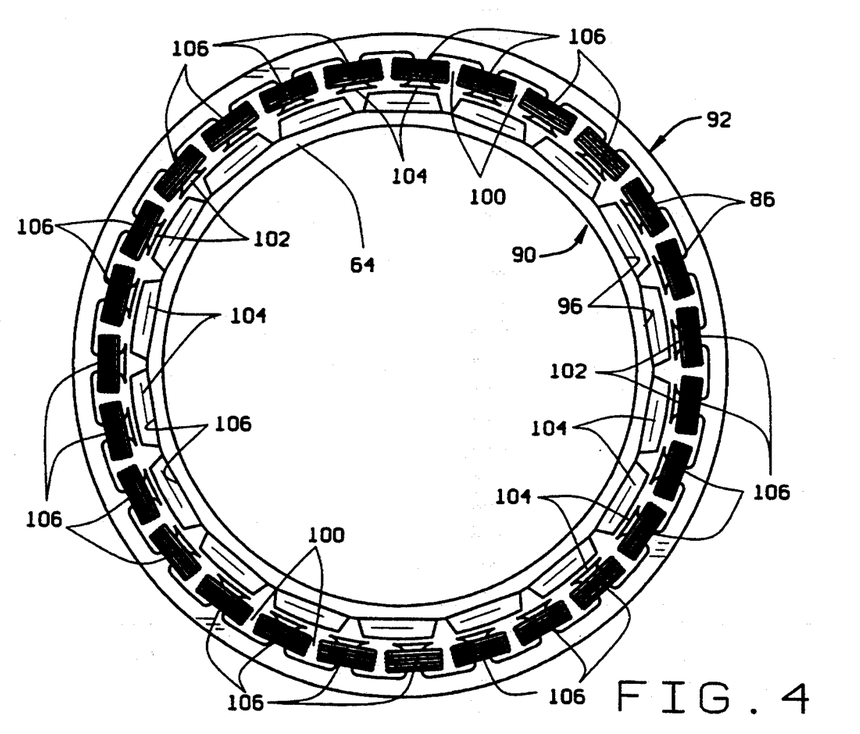
FIG. 4 is an end view of a generator forming part of the bearing.
Figure 6:
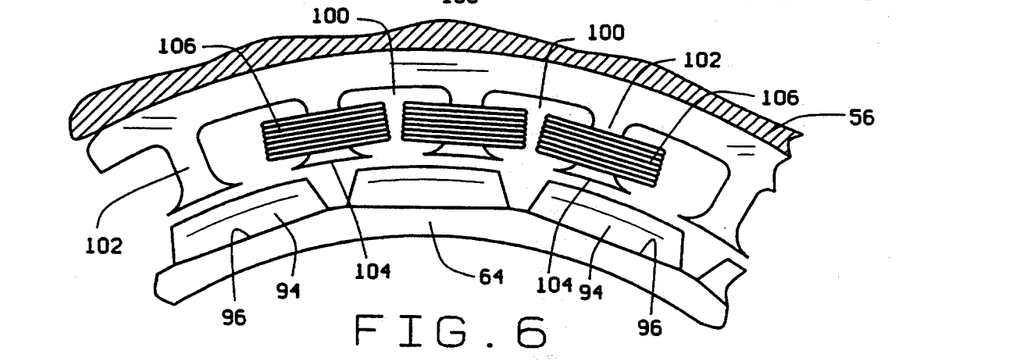
FIG. 6 is an enlarged fragmentary end view of the generator taken along line 6—6 of FIG. 5.

The rotor 90 includes (FIGS. 4–6) the spacer ring 64, which separates the cones 58 and establishes the setting for the bearing B, and also a series of permanent magnets 94 arranged at equal circumferential intervals around the ring 64. To this end, the outwardly presented surface of the ring 64 consists of a series of lands 96 arranged side-by-side around the ring 64. The lands 96 are slightly wider than the magnets 94 and a separate magnet 94 is attached to each land 76, preferably with a strong bonding agent such as an epoxy cement. An even number of lands 96 exist around the ring 64, and the magnets 94 are centered on their respective lands 96. Each magnet 94 has its poles arranged radially with respect to the ring 64, that is to say, with its north pole presented outwardly and the south pole presented inwardly or vice versa. The polarity for the magnets 94 alternates around the ring 64. The magnets 94 are formed from any of the available materials for permanent magnets, for example, neodymium-iron-boron. The stator 92 is formed from layers of motor grade magnetic steel sheets which are joined together into a lamination 98 having a cylindrical exterior surface that is slightly larger in diameter than the intervening surface 76 between the two raceways 74 in the cup 56 (FIGS. 4–6). The lamination 98 is advanced axially through one of the raceways 74 and forced into the intervening surface 76 where it remains firmly in place by reason of the interference fit. The lamination 98 contains a series of winding slots 100 which open inwardly toward the rotor 90 and teeth 102 which separate the slots 100. The teeth 102 flare circumferentially at their inner ends and terminate at arcuate end faces 104 which are presented quite close to the circle described by the outer faces of the magnets 94 as the rotor 90 revolves. Indeed, an air gap of about 0.015–0.020 inches exists between the circle defined by the fixed end faces 104 and the circle described by the rotating magnets 94.

Figure 7:
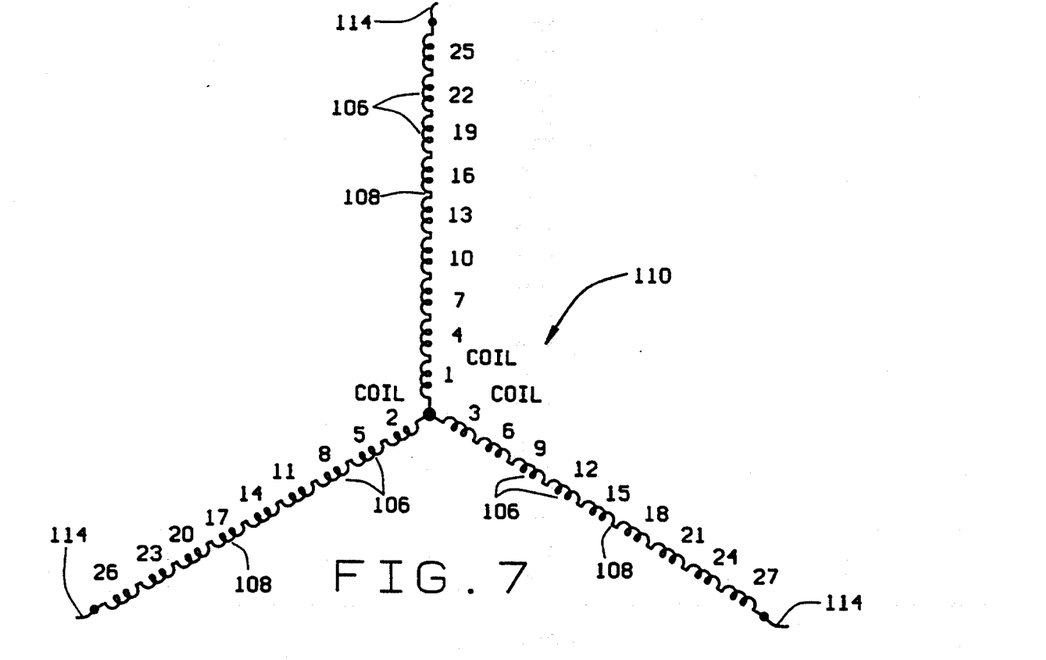
FIG. 7 is an electrical schematic view of the generator.

Each tooth 102 supports a coil 106 which encircles the tooth 102 and extends through the slots 100 on each side of the tooth 102. This arrangement creates nonoverlapping windings, but the windings could also be any of several multiphase overlapping types. In any event, the coils 106 are organized into phases 108. A three phase alternator will contain three phases 108 which may be connected to form a Y winding 110 (FIG. 7). When the stator 92 contains three phases 108, the number of slots 100 and teeth 102 on its lamination 98 should be divisible by three. The phases 108 terminate at leads 114 which pass through one of the radial bores 77 in the cup 56 and out of the adaptor C.

The leads 114 may be connected to a three phase rectifier which converts the three phase alternating current to direct current. The direct current charges a battery on the rail car.

The cup 56 need not be unitary; it may be divided into two components, that is separate single row cups, with perhaps a spacer between them. Even so, the annular space 66 would exist and the generator E would occupy the space 66.

A slightly modified bearing F (FIG. 8) has extended thrust ribs 80 on its cones 58 and the seals 16 and 20 are configured to establish dynamic fluid barriers around the extended ribs 80, and not around wear rings. In addition, the bearing F, in order to provide further protection for the generator E, carries an additional set of seals 118 which are fitted to the cup 56 at the ends of the annular space 66. The seals 118 establish fluid barriers between the intervening surface 76, on one hand, and the spacer ring 64 or retaining ribs 82 of the cones 58, on the other.

Figure 8:
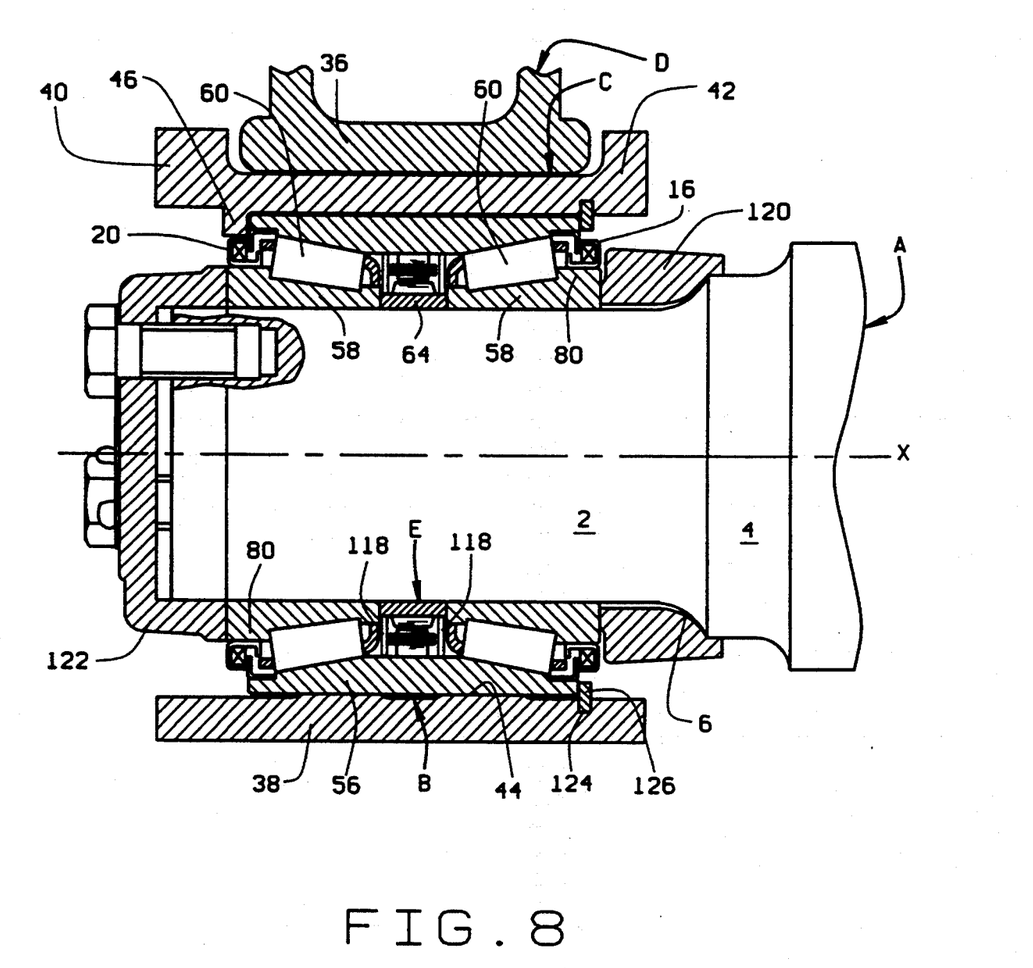
FIG. 8 is a longitudinal sectional view of a modified bearing and adaptor.

The bearing F lies between a slightly modified backing ring 120 and a slightly modified end cap 122. The former, in comparison to the backing ring 12, is slightly extended and bears directly against the inboard cone 58 of the bearing F. The latter, in contrast to the end cap 22, not only fits across the end face 8 of the journal 2, but also fits around the end of the journal where it bears directly against the outboard cone 58 of the bearing F.

The bearing F fits into a slightly modified adaptor G —modified in the sense that it has an annular groove 124 which opens into the bore 44 in the region of the inboard end ring 42. Actually, the groove 124 lies immediately beyond the end of the cup 56 when the cup 56 is fully installed in the bore 44, that is when its opposite end is against the rib 46. The annular groove 124 receives another rib in the form of a snap-type retaining ring 126. Thus, the cup 56 is captured between the rib 46 and the retaining ring 126.

This invention is intended to cover all changes and modifications of the example of the invention herein chosen for purposes of the disclosure which do not constitute departures from the spirit and scope of the invention.

What is claimed is:

1. A bearing for facilitating rotation about an axis and for further producing electrical energy, said bearing comprising:

an outer race having two raceways presented inwardly toward the axis; an inner race having two raceways presented outwardly toward and circumscribed by the raceways of the outer race; rolling elements arranged in two rows between the opposed raceways of the inner and outer races, with the rolling elements of the one row being spaced from the rolling elements of the other row, whereby an annular space exists within the bearing between the two rows; an electrical generator in the annular space and including a stator which is fixed in position with respect to one of the races and a rotor which is fixed in position with respect to the other race, all such that when the bearing is in operation with the rotor rotating relative to the stator, the generator will produce electrical energy.

2. A bearing according to claim 1 wherein the outer race is unitary and the stator is fixed in position with respect to it; and wherein the inner race includes two separate components and the rotor is fixed in position with respect to those components.

3. A bearing according to claim 2 wherein the rotor includes a spacer ring located between the two components of the inner race.

4. A bearing according to claim 1 wherein the outer race is unitary and its raceways are tapered, having their largest diameters at the ends of the outer race; wherein the inner race has two separate components, each having a raceway on it, with those raceways tapering in the same direction as the raceways by which they are circumscribed; wherein the rollers are tapered; wherein the stator is fixed in position with respect to the unitary outer race; and wherein the rotor is fixed in position with respect to the components of the inner race.

5. A bearing according to claim 4 wherein the rotor includes a spacer ring that separates the components of the inner race.

6. A bearing according to claim 1 wherein the rotor also includes at least one magnet that is fixed to the spacer ring, the magnet generating a varying magnetic field upon relative rotation of the rotor.

7. A bearing according to claim 6 wherein the stator includes at least one electric coil positioned such that it is linked to the magnetic field, whereby an electrical potential is induced across the coil.

8. A bearing according to claim 7 wherein the electrical potential produced by the generator is an alternating current (AC) signal.

9. In combination with an axle that rotates about an axis and has a journal, the improvement comprising an adaptor that fits around the journal; an outer bearing race located in the adaptor and having a raceway presented inwardly toward the axis of the axle; an inner bearing race fitted over the journal and located within the outer race, the inner race having a raceway presented outwardly away from the axis, yet being within and circumscribed by the raceway of the outer race; rolling elements located between and contacting the raceways of the inner and outer races; sealing surfaces located around the journal axially beyond the rolling elements; seals fitted to the outer race at its ends and forming static fluid barriers there and dynamic fluid barriers around the sealing surfaces; and an electrical generator located within the outer race between the seals so that it is protected by the seals, the generator including a stator carried by the outer race and a rotor that rotates with the inner race.

10. The combination according to claim 9 wherein the outer race has a pair of raceways, the inner race has a pair of raceways which are circumscribed by the raceways of the outer race, and the rolling elements are arranged in two rows between the opposed raceways on the outer and inner races; and wherein the stator and rotor for the generator are located between the two rows of rolling elements.

11. The combination according to claim 10 wherein the inner race includes two components; and further comprising a spacer ring fitted around the journal between the two components and separating them, the spacer ring forming part of the rotor.

12. The combination according to claim 11 and further comprising means for clamping the two components of the inner race and the spacer ring together on the journal, so that the components do not shift axially on the journal.

13. The combination according to claim 9 wherein an interference fit exists between the outer race and the adaptor for preventing the outer race from rotating in the adaptor.

14. A bearing for the journal of a rail car axle, said bearing having an axis and comprising: a unitary double cup having tapered raceways presented inwardly toward the axis; a pair of cones, each having a tapered raceway presented outwardly away from the axis, the raceway of the one cone being opposite the one raceway of the cup and the raceway of the other cone being opposite the other raceway of the cup; tapered rollers arranged in two rows between the opposed raceways of the cup and the cones, with the rollers of the one row being spaced axially from the rollers of the other row, whereby an annular space exists within the bearing between the two rows of rollers; a spacer ring located between the cones at the annular space; and an electrical generator located in the annular space for producing electrical energy, the generator including a stator that is carried by the cup in a fixed position with respect thereto and a rotor of which the spacer ring forms a part.

15. The bearing according to claim 14 and further comprising seals fitted to the ends of the cup for closing the ends of the space between the cup and the cones.

16. A bearing according to claim 14 wherein the cones abut the spacer ring, and the spacer ring determines the setting for the bearing.

17. A bearing assembly for facilitating rotation about an axis, said bearing assembly comprising: an outer bearing race having a raceway presented inwardly toward the axis; an inner bearing race located within the outer race, the inner race having a raceway presented outwardly away from the axis, yet being within and circumscribed by the raceway of the outer race; rolling elements located between and contacting the raceways of the inner and outer races; sealing surfaces located around the axis axially beyond the rolling elements; seals fitted to the outer race at its ends and forming static fluid barriers there and dynamic fluid barriers around the sealing surfaces; and an electrical generator located within the outer race between the seals so that it is protected by the seals, the generator including a stator that is fixed in position with respect to one of the races and a rotor that is fixed in position with respect to the other race.

18. A bearing assembly according to claim 17 and further comprising an adaptor which receives the outer bearing race and is configured externally to fit into a side frame of a rail car truck, the adaptor having an arcuate pad and an arcuate cradle; and wherein the outer race fits between the pad and cradle.

19. A bearing assembly according to claim 18 wherein the adaptor also includes axially spaced rings which hold the pad in a fixed and determined position with respect to the cradle.

20. A bearing according to claim 19 wherein an interference fit exists between the outer bearing race and the adaptor, whereby the outer race will not rotate in the adaptor.

* * * * *

UNITED STATES PATENT AND TRADEMARK OFFICE
CERTIFICATE OF CORRECTION

PATENT NO. : 5,440,184
DATED : Aug. 8, 1995
INVENTOR(S) : Ram P. Samy, etal

It is certified that error appears in the above-indentified patent and that said Letters Patent is hereby corrected as shown below:

Title Page, second line of title of the invention - delete "ELECTRIAL" and insert ---ELECTRICAL---

Title Page, at Inventors, line three - between "Uniontown," and "all" insert ---Samuel R. Williams, Dublin---

Column 1, second line of title of the invention - delete "ELECTRIAL" and insert ---ELECTRICAL---

Signed and Sealed this

Twenty-sixth Day of December, 1995

*Attest:*

BRUCE LEHMAN

*Attesting Officer*  *Commissioner of Patents and Trademarks*